United States Patent Office 3,776,919
Patented Dec. 4, 1973

3,776,919
2-ACYLAMINO - 1,3,4-THIADIAZOLE-(THI)ONE-(5) COMPOUNDS AND HERBICIDAL COMPOSITIONS
Klaus Sasse, Schildgen, and Ludwig Eue, Cologne, Germany, assignors to Bayer Aktiengesellschaft, Leverkusen, Germany
No Drawing. Filed Jan. 11, 1971, Ser. No. 105,741
Claims priority, application Germany, Jan. 24, 1970,
P 20 03 145.2
Int. Cl. C07d 91/62
U.S. Cl. 260—306.8 D                    17 Claims

ABSTRACT OF THE DISCLOSURE

Novel 2-acylamino-1,3,4-thiadiazolone-(5) and 2-acylamino-1,3,4-thiadiazole thione-(5) compounds of the formula

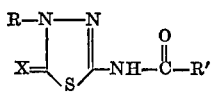

wherein
R and R' are unsubstituted or substituted alkyl, cycloalkyl, cycloalkenyl, aralkyl or aryl; and
X is oxygen or sulfur are outstandingly effective herbicides, particularly selective herbicides.

---

The present invention relates to certain new 2-alkylamino-1,3,4-thiadiazole-(thi)one-(5) compounds, to herbicidal compositions containing them and to their use as herbicides.

It is known that 2-acylaminobenzthiazoles, for example 2-propionylaminobenzthiazole, can be used as herbicidal active compounds (cf. German Auslegeschrift 1,211,856). Surprisingly, the 2-acylamino-1,3,4-thiadiazole-(thi)one-(5) of this invention show considerably stronger herbicidal properties, in particular stronger selective-herbicidal properties, that the 2-acylaminobenzthiazoles known from the prior art which are structurally the most closely related compounds of the same type of activity. The substances according to the invention therefore represent a substantial enrichment of the art.

The compounds of the present invention are 2-acylamino-1,3,4-thiadiazole-(thi)one-(5) compounds of the general formula:

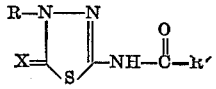

in which
R is alkyl, alkoxyalkyl; cycloalkyl and cycloalkenyl, of, e.g., 5 to 7 ring carbons, either of which may also contain fused aromatic or cycloaliphatic rings and may be substituted by halogen or alkyl radicals; aralkyl or aryl, the aryl portion of the two last-mentioned radicals optionally being substituted with alkyl, alkoxy, halogen, cyano, nitro, trifluoromethyl and/or dialkylamino; when R contains an alkyl moiety, this moiety is preferably lower alkyl, e.g. methyl, ethyl, propyl, isopropyl, butyl, or hexyl; generally, the R group will not contain more than 17 carbon atoms;
R' is alkyl of from 1 to 10 carbon atoms, alkenyl of from 2 to 6 carbon atoms or cycloalkyl of from 3 to 8 carbon atoms; and
X is oxygen or sulfur.

These compounds have been found to exhibit strong herbicidal, particularly selective herbicidal, properties.

The invention also provides a process for the production of a 2-acylamino-1,3,4-thiadiazole-(thi)one-(5) of the Formula I in which a 2-amino-1,3,4-thiadiazole-(thi)one-(5) of the general formula

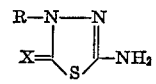

in which
R and X are defined as above is reacted with a carboxylic acid derivative of the formula

in which
R' is defined as above, and Y is chlorine, bromine or O—CO—R'.

The reaction may be carried out in the presence of a solvent and/or an acid-binding agent.

If 2-amino-4-phenyl-1,3,4-thiadiazolone-(5) and propionic anhydride are used as starting materials, the reaction course can be represented by the following formula scheme:

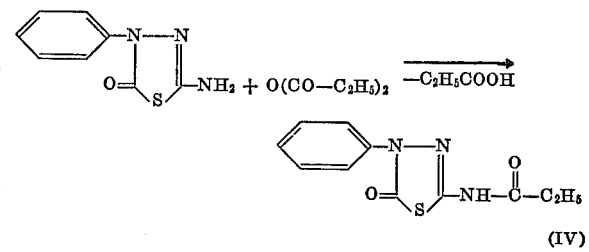

The 2-amino-1,3,4-thiadiazole-(thi)one-(5) to be used as starting materials are unambiguously characterized by the Formula II.

R stands preferably for alkyl with 1 to 13 carbon atoms, alkoxyalkyl with 1 to 4 carbon atoms in the alkoxy radical and 1 to 4 carbon atoms in the alkyl radical, cycloalkyl with 3 to 12 ring carbon atoms, cycloalkenyl which may contain fused carbocyclic rings with 5 to 8 carbon atoms and may be substituted by halogen and/or alkyl with 1 to 4 carbon atoms, aralkyl with 1 to 4 carbon atoms in the alkyl radical and 1 to 3 aryl radicals as substituents which, in turn, may be substituted by one or more halogen, alkyl (with 1 to 4 carbon atoms), alkoxy (with 1 to 4 carbon atoms), nitro, cyano, trifluoromethyl or dialkylamino groups (with 1 to 4 carbon atoms in each alkyl radical); further, preferably for phenyl and naphthyl, possibly substituted by one or more halogen, alkyl (with 1 to 4 carbon atoms), alkoxy (with 1 to 4 carbon atoms) nitro and/or trifluoromethyl groups. X stands preferably for oxygen.

As examples of the 2-amino-1,3,4-thiadiazole-(thi)one-(5) which can be used according to the invention, there may be mentioned in particular:

2-amino-4-methyl-1,3,4-thiadiazolone-(5)
2-amino-4-ethyl-1,3,4-thiadiazolone-(5)
2-amino-4-isopropyl-1,3,4-thiadiazolone-(5)
2-amino-4-butyl-1,3,4-thiadiazolone-(5)
2-amino-4-sec.-butyl-1,3,4-thiadiazolone-(5)
2-amino-4-heptyl-1,3,4-thiadiazolone-(5)
2-amino-4-(1-propyl-butyl)-1,3,4-thiadiazolone-(5)
2-amino-4-(2-ethyl-hexyl)-1,3,4-thiadiazolone-(5)
2-amino-4-(1-methyl-dodecyl)-1,3,4-thiadiazolone-(5)
2-amino-4-(2-butoxy-ethyl)-1,3,4-thiadiazolone-(5)
2-amino-4-benzyl-1,3,4-thiadiazolone-(5)
2-amino-4-(4-chloro-benzyl)-1,3,4,-thiadiazolone-(5)
2-amino-4-(4-methoxy-benzyl)-1,3,4-thiadiazolone-(5)
2-amino-4-(4-butyl-benzyl)-1,3,4-thiadiazolone-(5)
2-amino-4-(2,4,5-trichloro-benzyl)-1,3,4-thiadiazolone-(5)

2-amino-4-(3-nitro-benzyl)-1,3,4-thiadiazolone-(5)
2-amino-4-(4-cyano-benzyl)-1,3,4-thiadiazolone-(5)
2-amino-4-(4-trifluoromethyl-benzyl)-1,3,4-thiadiazolone-(5)
2-amino-4-(1-phenyl-ethyl)-1,3,4-thiadiazolone-(5)
2-amino-4-diphenylmethyl-1,3,4-thiadiazolone-(5)
2-amino-4-triphenylmethyl-1,3,4-thiadiazolone-(5)
2-amino-4-(3-phenyl-propyl)-1,3,4-thiadiazolone-(5)
2-amino-4-(1-naphthyl-(1)-ethyl)-1,3,4-thiadiazolone-(5)
2-amino-4-cyclopropyl-1,3,4-thiadiazolone-(5)
2-amino-4-cyclopentyl-1,3,4-thiadiazolone-(5)
2-amino-4-cyclohexyl-1,3,4-thiadiazolone-(5)
2-amino-4-(4-methyl-cyclohexyl)-1,3,4-thiadiazolone-(5)
2-amino-4-cyclododecyl-1,3,4-thiadiazolone-(5)
2-amino-4-(3,4,5-trimethyl-cyclohexen-(2)-yl)-1,3,4-thiadiazolone-(5)
2-amino-4-[(1,2,3,4-tetrahydronaphthyl-(1)]-1,3,4-thiadiazolone-(5)
2-amino-4-phenyl-1,3,4-thiadiazolone-(5)
2-amino-4-(4-chloro-phenyl)-1,3,4-thiadiazolone-(5)
2-amino-4-(3,4-dichloro-phenyl)-1,3,4-thiadiazolone-(5)
2-amino-4-(4-bromo-phenyl)-1,3,4-thiadiazolone-(5)
2-amino-4-(4-fluoro-phenyl)-1,3,4-thiadiazolone-(5)
2-amino-4-(4-iodo-phenyl)-1,3,4-thiadiazolone-(5)
2-amino-4-(4-methyl-phenyl)-1,3,4-thiadiazolone-(5)
2-amino-4-(4-trifluoromethyl-phenyl)-1,3,4-thiadiazolone-(5)
2-amino-4-(2-chloro-4-trifluoromethyl-phenyl)-1,3,4-thiadiazolone-(5)
2-amino-4-(2-nitro-phenyl)-1,3,4-thiadiazolone-(5)
2-amino-4-(4-cyano-phenyl)-1,3,4-thiadiazolone-(5)
2-amino-4-naphthyl-(1)-1,3,4-thiadiazolone-(5)
2-amino-4-methyl-1,3,4-thiadiazole-thione-(5)
2-amino-4-ethyl-1,3,4-thiadiazole-thione-(5)
2-amino-4-isopropyl-1,3,4-thiadiazole-thione-(5)
2-amino-4-butyl-1,3,4-thiadiazole-thione-(5)
2-amino-4-isobutyl-1,3,4-thiadiazole-thione-(5)
2-amino-4-cyclopentyl-1,3,4-thiadiazole-thione-(5)
2-amino-4-cyclohexyl-1,3,4-thiadiazole-thione-(5)
2-amino-4-benzyl-1,3,4-thiadiazole-thione-(5)

The 2-amino-1,3,4-thiadiazole-(thi)one-(5) of the Formula II which can be used in the process of the invention are, in part, novel. Indications for their preparation are in: "Five-Membered Heterocyclic Compounds With Nitrogen and Sulfur or Nitrogen, Sulfur and Oxygen," pages 153–173 (1952), in the series A. Weissberger, "The Chemistry of Heterocyclic Compounds," Interscience Publishers, New York.

These starting materials are preferably prepared by action of phosgene or thiophosgene on 1-substituted thiosemicarbazides in the presence of water.

The carboxylic acid derivatives used as starting materials are unambiguously defined by the Formula III.

R' stands preferably for alkyl with 1 to 6 carbon atoms, alkenyl with 2 to 4 carbon atoms or cycloalkyl with 3 to 6 carbon atoms.

As examples of such carboxylic acid derivatives to be used according to the invention, there may be mentioned in particular: acetyl chloride, acetyl bromide, propionyl chloride, propionyl bromide, butyroyl chloride, isobutyroyl chloride, cyclopentane carboxylic acid chloride, crotonoyl chloride, acrylic acid chloride, cyclopropane carboxylic acid chloride, valeroyl chloride, cyclohexane carboxylic acid chloride as well as acetic anhydride, propionic anhydride, butyric anhydride, isobutyric anhydride and valeric anhydride.

These carboxylic acid derivatives are known from the literature.

The reaction of 2-amino-1,3,4-thiadiazole-(thi)one-(5) with the carboxylic acid derivatives can be carried out with or without a solvent (this term includes a mere diluent). Preferably, the work is carried out in the presence of a solvent. All organic solvents are suitable which do not themselves react with the carboxylic acid derivatives, for example hydrocarbons, such as benzine, ligroin, hexane, benzene, toluene; chlorinated hydrocarbons, such as methylene chloride, chloroform, carbon tetrachloride, chlorobenzene; nitrated hydrocarbons, such as nitrobenzene; ethers, such as diethyl ether, dibutyl ether, tetrahydrofuran, dioxan; ketones, such as acetone, methylisopropyl ketone, acetophenone, cyclohexanone; and any desired mixtures of these solvents.

The use of an acid-binding agent is, as a rule, not necessary, but the reactions can be carried out in the presence of an acid-binder. Suitable for this purpose are inorganic bases, such as alkaline earth metal hydroxides, for example calcium and barium hydroxide, alkali metal carbonates or alkaline earth metal carbonates, such as sodium carbonate, potassium carbonate and calcium carbonate, as well as tertiary amines, such as triethylamine, N,N-dimethylaniline and pyridine. The acid-binding agents can be used in catalytic stoichiometric or excess amounts.

The reaction temperature can be varied within a fairly wide range. In general, the reaction is carried out at from −20° C. to +200° C., preferably at 0 to 180° C.

In general, the work is carried out at normal pressure, but the reactions can also be carried out in closed vessels at increased pressure without disadvantageous effect.

The reaction of 2-amino-1,3,4-thiadiazole-(thi)one-(5) with the carboxylic acid derivatives may be carried out in conventional manner, for example by boiling a solution of equimolar amounts of the two components for several hours under reflux. The working up may also take place in customary manner, for example by distilling off the solvent, pouring into water, filtering and recrystalising.

Typical examples of the new compounds of the invention are the following:

2-propionylamino-4-methyl-1,3,4-thiadiazolone-(5)
2-acetylamino-4-ethyl-1,3,4-thiadiazolone-(5)
2-propionylamino-4-ethyl-1,3,4-thiadiazolone-(5)
2-propionylamino-4-propyl-1,3,4-thiadiazolone-(5)
2-butyrylamino-4-propyl-1,3,4-thiadiazolone-(5)
2-isobutyrylamino-4-propyl-1,3,4-thiadiazolone-(5)
2-(1-methyl-butyl-amino)-4-propyl-1,3,4-thiadiazolone-(5)
2-(1,1-dimethyl-propionyl-amino)-4-propyl-1,3,4-thiadiazolone-(5)
2-(1,1-dimethyl-valeroyl-amino)-4-propyl-1,3,4-thiadiazolone-(5)
2-(1-methyl-acryl-amino)-4-propyl-1,3,4-thiadiazolone-(5)
2-crotonylamino-4-propyl-1,3,4-thiadiazolone-(5)
2-(2,2-dimethyl-acryl-amino)-4-propyl-1,3,4-thiadiazolone-(5)
2-cyclopropylamino-4-propyl-1,3,4-thiadiazolone-(5)
2-cyclopentylamino-4-propyl-1,3,4-thiadiazolone-(5)
2-cyclohexylamino-4-propyl-1,3,4-thiadiazolone-(5)
2-propionylamino-4-propyl-1,3,4-thiadiazolone-(5)
2-propionylamino-4-isopropyl-1,3,4-thiadiazolone-(5)
2-propionylamino-4-butyl-1,3,4-thiadiazolone-(5)
2-propionylamino-4-isobutyl-1,3,4-thiadiazolone-(5)
2-propionylamino-4-sec.-butyl-1,3,4-thiadiazolone-(5)
2-propionylamino-4-heptyl-1,3,4-thiadiazolone-(5)
2-propionylamino-4-(1-propyl-butyl)-1,3,4-thiadiazolone-(5)
2-propionylamino-4-(2-ethyl-hexyl)-1,3,4-thiadiazolone-(5)
2-propionylamino-4-(1-methyl-dodecyl)-1,3,4-thiadiazolone-(5)
2-propionylamino-4-(2-butoxy-ethyl)-1,3,4-thiadiazolone-(5)
2-propionylamino-4-benzyl-1,3,4-thiadiazolone-(5)
2-propionylamino-4-(4-chloro-benzyl)-1,3,4-thiadiazolone-(5)
2-propionylamino-4-(4-methoxy-benzyl)-1,3,4-thiadiazolone-(5)
2-propionylamino-4-(4-butyl-benzyl)-1,3,4-thiadiazolone-(5)
2-propionylamino-4-(2,4,5-trichloro-benzyl)-1,3,4-thiadiazolone-(5)

2-propionylamino-4-(3-nitro-benzyl)-1,3,4-thiadiazolone-(5)
2-propionylamino-4-(4-cyano-benzyl)-1,3,4-thiadiazolone-(5)
2-propionylamino-4-(4-trifluoromethyl-benzyl)-1,3,4-thiadiazolone-(5)
2-propionylamino-4-(1-phenyl-ethyl)-1,3,4-thiadiazolone-(5)
2-propionylamino-4-diphenylmethyl-1,3,4-thiadiazolone-(5)
2-propionylamino-4-triphenylmethyl-1,3,4-thiadiazolone-(5)
2-propionylamino-4-(3-phenyl-propyl)-1,3,4-thiadiazolone-(5)
2-propionylamino-4-(1-naphthyl-(1)-ethyl)-1,3,4-thiadiazolone-(5)
2-propionylamino-4-cyclopropyl-1,3,4-thiadiazolone-(5)
2-propionylamino-4-cyclopentyl-1,3,4-thiadiazolone-(5)
2-propionylamino-4-cyclohexyl-1,3,4-thiadiazolone-(5)
2-propionylamino-4-(4-methyl-cyclohexyl)-1,3,4-thiadiazolone-(5)
2-propionylamino-4-cyclododecyl-1,3,4-thiadiazolone-(5)
2-propionylamino-4-(3,4,5-trimethyl-cyclohexen-(2)-yl)-1,3,4-thiadiazolone-(5)
2-propionylamino-4-[(1,2,3,4-tetrahydronaphthyl-(1)]-1,3,4-thiadiazolone-(5)
2-acetylamino-4-phenyl-1,3,4-thiadiazolone-(5)
2-propionylamino-4-phenyl-1,3,4-thiadiazolone-(5)
2-isobutyrylamino-4-phenyl-1,3,4-thiadiazolone-(5)
2-(1-methyl-butyryl-amino)-4-phenyl-1,3,4-thiadiazolone-(5)
2-(1,1-dimethyl-propionyl-amino)-4-phenyl-1,3,4-thiadiazolone-(5)
2-(1,1-dimethyl-valeroyl-amino)-4-phenyl-1,3,4-thiadiazolone-(5)
2-cyclopropylamino-4-phenyl-1,3,4-thiadiazolone-(5)
2-propionylamino-4-(4-chloro-phenyl)-1,3,4-thiadiazolone-(5)
2-propionylamino-4-(3,4-dichloro-phenyl)-1,3,4-thiadiazolone-(5)
2-propionylamino-4-(4-bromo-phenyl)-1,3,4-thiadiazolone-(5)
2-propionylamino-4-(4-fluoro-phenyl)-1,3,4-thiadiazolone-(5)
2-propionylamino-4-(4-iodo-phenyl)-1,3,4-thiadiazolone-(5)
2-propionylamino-4-(4-methyl-phenyl)-1,3,4-thiadiazolone-(5)
2-propionylamino-4-(4-trifluoromethyl-phenyl)-1,3,4-thiadiazolone-(5)
2-propionylamino-4-(2-chloro-4-trifluoromethyl-phenyl)-1,3,4-thiadiazolone-(5)
2-propionylamino-4-(2-nitro-phenyl)-1,3,4-thiadiazolone-(5)
2-propionylamino-4-(4-cyano-phenyl)-1,3,4-thiadiazolone-(5)
2-propionylamino-4-naphthyl-(1)-1,3,4-thiadiazolone-(5)
2-propionylamino-4-methyl-1,3,4-thiadiazole-thione-(5)
2-propionylamino-4-ethyl-1,3,4-thiadiazole-thione-(5)
2-propionylamino-4-isopropyl-1,3,4-thiadiazole-thione-(5)
2-propionylamino-4-butyl-1,3,4-thiadiazole-thione-(5)
2-propionylamino-4-isobutyl-1,3,4-thiadiazole-thione-(5)
2-propionylamino-4-cyclopentyl-1,3,4-thiadiazole-thione-(5)
2-propionylamino-4-cyclohexyl-1,3,4-thiadiazole-thione-(5)
2-propionylamino-4-benzyl-1,3,4-thiadiazole-thione-(5)

The 2 - acylamino-1,3,4-thiadiazole-(thi)one-(5) according to the invention exhibit a strong herbicidal potency and can therefore be used as weedkillers.

By weeds in the widest sense are meant all plants which grow in places where they are not desired. Whether the active compounds according to the invention act as total or as selective herbicidal agents depends on the amount of active compound applied.

The active compounds according to the invention can be used for example in the case of the following plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging neetle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum).

The active compounds are preferably used as selective herbicides. They exhibit for example a good selectivity in cotton, carrots, wheat, oats and maize as well as in other cultivations.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing agents include lignin sulfite waste liquors and methyl cellulose.

The active compounds according to the invention may be present in the formulations in admixture with other active compounds.

The formulations contain, in general, from 0.1 to 95, preferably 0.5 to 90, percent by weight of active compound.

The active compounds may be applied as such or in the form of their formulations or of the application forms prepared therefrom, such as ready-to-use solutions, emulsions, suspensions, powders, pastes and granulates. Application may take place in the usual manner, for example, by dusting, spraying, squirting, watering or scattering.

The active compounds can be applied both before the emergence and after the emergence of the plants.

The amount applied may vary within fairly wide ranges. It depends essentially on the nature of the desired effect. In general, the amounts applied are from 0.1 to 20 kg. of active compound per hectare, preferably 0.5 to 10 kg. per hectare.

The invention therefore provides a herbicidal composition containing as active ingredient a compound according to the invention in admixture with a solid diluent or carrier or in admixture with a liquid diluent or carrier containing a surface-active agent.

The invention also provides a method of combatting weeds which comprises applying to the weeds or a weed habitat a compound according to the invention alone or in the form of a composition containing as active ingredient a compound according to the invention in admixture with a solid or liquid diluent or carrier.

The invention is illustrated without limitation by the following examples, in which the following test compounds were employed:

was added and the concentrate was then diluted with water to the desired concentration.

Test plants which had a height of 5–15 cm. were sprayed with the preparation of the active compound so that the amounts of active compound per unit area which are stated in the table are applied. According to concentration of the spray liquid, the amount of water applied lies between 1000 and 2000 litres/hectare. After 3 weeks, the degree of damage to the plants were determined and char-

TABLE

| Compound No. | Chemical name | Structure |
|---|---|---|
| 1 | 2-acetylamino-4-cyclohexyl-1,3,4-thiadiazolone-(5) | |
| 2 | 2-propionylamino-4-phenyl-1,3,4-thiadiazolone-(5) | |
| 3 | 2-propionlyamino-4-cyclohexyl-1,3,4-thiadiazolone-(5) | |
| 4 | 2-isobutyrylamino-4-cyclohexyl-1,3,4-thiadiazolone-(5) | |
| 5 | 2-isobutyrylamino-4-phenyl-1,3,4-thiadiazolone-(5) | |

EXAMPLE A

Post-emergence test

Solvent: 5 parts by weight acetone

Emulsifier: 1 part by weight alkylaryl polyglycol ether

To produce a suitable preparation of active compound, 1 part by weight of active compound was mixed with the stated amount of solvent, the stated amount of emulsifier acterized by the values 0 to 5, which have the following meaning:

| | |
|---|---|
| 0 | No effect. |
| 1 | A few slightly burnt spots. |
| 2 | Marked damage to leaves. |
| 3 | Some leaves and parts of stalks partially dead. |
| 4 | Plant partially destroyed. |
| 5 | Plant completely dead. |

The active compounds, the amount applied and the results are set forth in Table A, below:

TABLE A.—POST-EMERGENCE TEST

| Active compound | Active compound applied, kg./hectare | Echino-chloa | Cheno-podium | Sinapis | Galin-soga | Stel-laria | Urtica | Oats | Cotton | Wheat | Carrots |
|---|---|---|---|---|---|---|---|---|---|---|---|
| (benzothiazole structure) C—NH—C—C₂H₅ | 2 | 5 | 3 | 5 | 4–5 | 5 | 5 | 3 | 1 | 3–4 | |
| | 1 | 5 | 1 | 5 | 3 | 2 | 5 | 2 | 1 | 2 | |
| | 0.5 | 5 | 1 | 4–5 | 2 | 0 | 5 | 1 | 1 | 1 | |
| Compound 1 | 2 | 5 | 5 | 5 | 4 | 4 | 5 | 4 | 1 | 1 | 1 |
| | 1 | 5 | 5 | 5 | 4 | 4 | 4 | 3 | 0 | 0 | 1 |
| | 0.5 | 4 | 4 | 4 | 3 | 4 | 4 | 2 | 0 | 0 | 0 |
| Compound 2 | 2 | 5 | 5 | 5 | 5 | 5 | 5 | 4–5 | 4 | 2 | 5 |
| | 1 | 5 | 5 | 5 | 5 | 5 | 5 | 4 | 3 | 1 | 5 |
| | 0.5 | 5 | 5 | 5 | 5 | 5 | 5 | 3 | 2 | 0 | 4 |
| Compound 3 | 2 | 5 | 5 | 5 | 5 | 5 | 5 | 4–5 | 4–5 | 4–5 | 0 |
| | 1 | 5 | 5 | 5 | 5 | 5 | 5 | 4 | 3 | 4 | 0 |
| | 0.5 | 4–5 | 4–5 | 4–5 | 5 | 4–5 | 4 | 4 | 1 | 4 | 0 |
| Compound 4 | 2 | 5 | 5 | 5 | 5 | 5 | 5 | 4 | 1 | 2 | 5 |
| | 1 | 5 | 5 | 5 | 5 | 4–5 | 4–5 | 3 | 0 | 1 | 4 |
| | 0.5 | 5 | 5 | 5 | 4–5 | 4 | 4 | 3 | 0 | 0 | 2 |
| Compound 5 | 2 | 5 | 5 | 5 | 5 | 5 | 4–5 | 1 | 2 | 5 | |
| | 1 | 5 | 5 | 5 | 5 | 5 | 5 | 3 | 0 | 0 | 5 |
| | 0.5 | 5 | 5 | 5 | 5 | 5 | 5 | 2 | 0 | 0 | 4 |

EXAMPLE B
Pre-emergence test

Solvent: 5 parts by weight acetone
Emulsifier: 1 part by weight alkylaryl polyglycol ether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants was determined and characterized by the values 0 to 5, which have the following meaning:

0 _____ No effect.
1 _____ Slight damage or delay in growth.
2 _____ Marked damage or inhibition of growth.
3 _____ Heavy damage and only deficient development or only 50% emerged.
4 _____ Plants partially destroyed after germination or only 25% emerged.
5 _____ Plants completely dead or not emerged.

The active compounds, the amount applied and the results are set forth in Table B, below.

Example 2.—Preparation of 2-isobutyrylamino-4-cyclohexyl-1,3,4-thiadiazolone-(5)

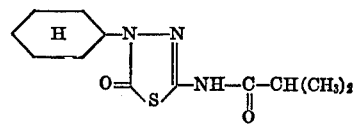

199 g. (1 mole) 2-amino-4-cyclohexyl-1,3,4-thiadiazolone-(5) in 600 ml. toluene with 106.5 g. (1 mole) isobutyric acid chloride were heated to the boil until the splitting off of hydrogen chloride had ended (about 3 hours). The product which separated upon cooling to 0° C. was filtered off with suction, washed with a little toluene and dried.

Yield: 230 g. (85.5% of the theory) 2-isobutyrylamino-4-cyclohexyl-1,3,4-thiadiazolone-(5); M.P. 182–183° C. (from ethyl acetate).

The 2-amino-4-cyclohexyl-1,3,4-thiadiazolone-(5) required as starting material can be prepared as follows:

173 g. (1 mole) 1-cyclohexylthiosemicarbazide were suspended in 1250 ml. water. Heating to 80° C. was effected, and at this temperature a total of 125 g. (=1.25 mole) phosgene was introduced for about 3 hours. Cooling to 15° C. was effected; the reaction product was filtered off with suction and it was dried at 100° C.

Yield: 145 g. (73% of the theory); M.P. 185° C. (from butanol).

TABLE B.—PRE-EMERGENCE TEST

| Active compound | Active compound applied, kg./hectare | Echinochloa | Chenopodium | Sinapis | Galinsoga | Stellaria | Matricaria | Oats | Cotton | Wheat | Maize |
|---|---|---|---|---|---|---|---|---|---|---|---|
| (structure: C—NH—C—C₂H₅) | 20 | 2 | 5 | 3 | 4 | 4 | 4 | 0 | 4 | 0 | 2 |
|  | 10 | 1 | 4 | 3 | 3 | 4 | 3 | 0 | 4 | 0 | 2 |
|  | 5 | 0 | 3 | 2 | 2 | 2 | 2 | 0 | 2 | 0 | 0 |
| Compound 1 | 20 | 5 | 5 | 5 | 5 | 5 | 5 | 3 | 3 | 3 | 2 |
|  | 10 | 4 | 5 | 5 | 5 | 5 | 4 | 2 | 2 | 2 | 1 |
|  | 5 | 4 | 5 | 5 | 5 | 5 | 4 | 1 | 1 | 1 | 0 |
| Compound 2 | 20 | 5 | 5 | 5 | 5 | 5 | 5 | 3-4 | 4-5 | 2 | 3 |
|  | 10 | 4-5 | 5 | 5 | 5 | 5 | 5 | 2 | 4 | 1 | 2 |
|  | 5 | 4 | 5 | 5 | 5 | 5 | 5 | 1 | 3 | 0 | 1 |
| Compound 3 | 20 | 5 | 5 | 5 | 5 | 5 | 5 | 2 | 2 | 3 | 1-2 |
|  | 10 | 5 | 5 | 5 | 5 | 5 | 5 | 1 | 1 | 2-3 | 0 |
|  | 5 | 5 | 5 | 5 | 5 | 5 | 5 | 0 | 0 | 2 | 0 |

The preparation of the instant compounds is illustrated in the following examples.

Example 1.—Preparation of 2-propionylamino-4-phenyl-1,3,4-thiadiazolone-(5)

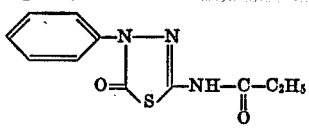

193 g. (1 mole) 2-amino-4-phenyl-1,3,4-thiadiazolone-(5) were boiled under reflux for 5 hours with 550 g. propionic anhydride. Cooling to 0° C. was effected; the separated crystals were filtered off with suction and they were washed with a little butanol.

Yield: 182 g. (73% of the theory) 2-propionylamino-4-phenyl-1,3,4-thiadiazolone-(5); M.P. 208° C. (from butanol).

By working up of the mother liquor, a further amount of the same product can be obtained.

Example 3.—Preparation of 2-propionylamino-4-butyl-1,3,4-thiadiazole-thione-(5)

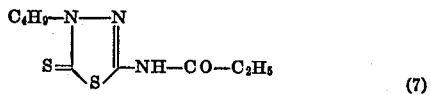

(7)

189 g. (1 mole) 2-amino-4-butyl-1,3,4-thiadiazolethione-(5) were boiled under reflux for 5 hours with 500 g. propionic anhydride. The excess propionic anhydride together with the propionic acid formed was subsequently distilled off in a vacuum, the residue was stirred together with water, filtered off with suction and dried.

Yield: of 2-propionylamino-4-butyl - 1,3,4 - thiadiazolethione-(5): practically quantitative; M.P. 127° C. (from carbontetrachloride).

The 2-amino-4-butyl-1,3,4-thiadiazole-thione-(5) required as starting material can be prepared as follows:

147 grams (1 mole) 1-butylthiosemicarbazide were suspended in 450 ml. chloroform. 115 grams (1 mole) thiophosgene were added dropwise at 20–25° C. with slight cooling. The mixture was then gradually heated to the boil and boiled under reflux for 2 hours. When the solution formed was evaporated, the desired product remained behind in practically quantitative yield. M.P.: 76–78° C. (from toluene).

EXAMPLES 4–24

In manner analogous to that of Example 3, the compounds set forth in Table 1, below, were prepared. In Table 1, the compounds are set forth by identification of the R, R' and X radicals in Formula I, above:

phenylmethyl; phenylalkyl; benzyl substituted by from 1 to 3 halo, alkyl, alkoxyl, nitro, cyan, trifluoromethyl, or dialkylamino groups; naphthyl; phenyl optionally substituted by 1 or 2 halo, alkyl, alkoxy, nitro, and/or trifluoromethyl groups; or tetrahydronaphthyl; wherein unless otherwise specified each alkyl has from 1 to 4 carbon atoms;

R' is alkyl of from 1 to 10 carbon atoms, alkenyl of from 2 to 6 carbon atoms or cycloalkyl of from 3 to 8 carbon atoms; and X is oxygen or sulfur.

TABLE 1

| Example No. | R | R' | X | M.P. (° C.) | Recrystallized from— |
|---|---|---|---|---|---|
| 4 | $C_2H_5-$ | $C_2H_5$ | O | 178 | Isopropanol/water. |
| 5 | $(CH_3)_2CH-$ | $C_2H_5$ | O | 168 | Toluene. |
| 6 | $C_4H_9-$ | $C_2H_5$ | O | 128 | Do. |
| 7 | $(CH_3)_2CH-CH_2-$ | $C_2H_5$ | O | 138 | Do. |
| 8 | phenyl-$CH_2-$ | $C_2H_5$ | O | 150 | Do. |
| 9 | Cl-phenyl-$CH_2-$ | $C_2H_5$ | O | 185–186 | Ethanol. |
| 10 | cyclopentyl | $C_2H_5$ | O | 158–159 | Toluene. |
| 11 | cyclohexyl | $CH_3$ | O | 175–176 | Ethyl acetate. |
| 12 | Same as above | $C_2H_5$ | O | 180–181 | Ethanol. |
| 13 | do | $-\overset{CH_3}{\underset{-C=CH_2}{C}}$ | O | 122–123 | White spirit. |
| 14 | do | cyclopropyl | O | 217–218 | Butanol. |
| 15 | phenyl | $CH_3$ | O | 220 | Do. |
| 16 | Same as above | $CH(CH_3)_2$ | O | 169 | Ethanol. |
| 17 | do | $-\overset{CH_3}{\underset{C=CH_2}{C}}$ | O | 158–159 | Carbon tetrachloride. |
| 18 | $C_2H_5-$ | $C_2H_5$ | S | 213–214 | Butanol. |
| 19 | $(CH_3)_2CH-CH_2-$ | $C_2H_5$ | S | 131 | Carbon tetrachloride. |
| 20 | phenyl-$CH_2-$ | $C_2H_5$ | S | 196–197 | Butanol. |
| 21 | Cl-phenyl-$CH_2-$ | $C_2H_5$ | S | 173 | Toluene. |
| 22 | cyclopentyl | $C_2H_5$ | S | 215–216 | Butanol. |
| 23 | cyclohexyl | $C_2H_5$ | S | 238–239 | Do. |
| 24 | Same as above | $CH(CH_3)_2$ | S | 215–216 | Ethanol. |

It will be understood that the foregoing specification and examples are illustrative and not limitative of the present invention in that many other embodiments of the invention will suggest themselves to those skilled in the art.

What is claimed is:

1. 2-acylamino-1,3,4-thiadiazolone-(5) or -thiadiazole thione-(5) compound of the general formula

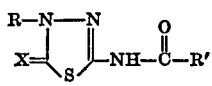

wherein

R is $C_1$–$C_{13}$ alkyl; alkoxyalkyl; cycloalkyl with 3 to 12 ring carbon atoms; 3,4,5-trimethylcyclohexen-2-yl; di- 2. Compound as claimed in claim 1 wherein X is oxygen.

3. Compound as claimed in claim 1 wherein X is sulfur.

4. Compound as claimed in claim 1 wherein R is alkyl of from 1 to 13 carbon atoms.

5. Compound as claimed in claim 1 wherein R is phenyl optionally substituted by 1 or 2 halo, alkyl, alkoxy, nitro, and/or trifluoromethyl groups.

6. Compound as claimed in claim 1 wherein R is benzyl substituted by from 1 to 3 halo, alkyl, alkoxyl, nitro, cyano, trifluoromethyl, or dialkylamino groups.

7. Compound as claimed in claim 1 wherein R is cyclopentyl or cyclohexyl.

8. Compound as claimed in claim 1 wherein R is 3,4,5-triethylcyclohexen-2-yl.

9. Compound as claimed in claim 1 wherein R' is alkyl of from 1 to 10 carbon atoms.

10. Compound as claimed in claim 1 wherein R' is alkenyl of from 2 to 6 carbon atoms.

11. Compound as claimed in claim 1 wherein R' is cycloalkyl of from 3 to 8 carbon atoms.

12. Compound as claimed in claim 1 wherein X is oxygen, R is phenyl or cyclohexyl and R' is alkyl of from 1 to 8 carbon atoms.

13. Compound as claimed in claim 1 designated as 2-acetylamino-4-cyclohexyl-1,3,4-thiadiazolone-(5).

14. Compound as claimed in claim 1 designated as 2-propionylamino-4-phenyl-1,3,4-thiadiazolone-(5).

15. Compound as claimed in claim 1 designated as 2-propionylamino-4-cyclohexyl-1,3,4-thiadiazolone-(5).

16. Compound as claimed in claim 1 designated as 2-isobutyrylamino-4-cyclohexyl-1,3,4-thiadiazolone-(5).

17. Compound as claimed in claim 1 designated as 2-iso-butyrylamino-4-phenyl-1,3,4-thiadiazolone-(5).

References Cited
UNITED STATES PATENTS 3,565,901   2/1971   Cebalo _____ 260—306.8 D R. J. GALLAGHER, Primary Examiner U.S. Cl. X.R.

71—90